United States Patent
Kim et al.

(10) Patent No.: US 9,612,790 B2
(45) Date of Patent: Apr. 4, 2017

(54) METHOD AND ELECTRONIC DEVICE FOR PROVIDING FRAME INFORMATION

(71) Applicant: Samsung Electronics Co., Ltd., Gyeonggi-do (KR)

(72) Inventors: Soo-Hyung Kim, Gyeonggi-do (KR); Heung-Sik Shin, Jeollabuk-do (KR); Hyun-Soo Kim, Gyeonggi-do (KR); Soon-Hyun Cha, Gyeonggi-do (KR)

( * ) Notice: Subject to any disclaimer, the term of this patent is extended or adjusted under 35 U.S.C. 154(b) by 0 days.

(21) Appl. No.: 14/676,667

(22) Filed: Apr. 1, 2015

(65) Prior Publication Data

US 2015/0277845 A1 Oct. 1, 2015

(30) Foreign Application Priority Data

Apr. 1, 2014 (KR) .......................... 10-2014-0038620

(51) Int. Cl.
*G06F 3/14* (2006.01)

(52) U.S. Cl.
CPC ..... *G06F 3/1462* (2013.01); *G09G 2320/103* (2013.01); *G09G 2330/021* (2013.01); *G09G 2360/18* (2013.01)

(58) Field of Classification Search
None
See application file for complete search history.

(56) References Cited

U.S. PATENT DOCUMENTS

| 8,811,714 | B2 | 8/2014 | Gyoda et al. |
| 2005/0136985 | A1 | 6/2005 | Ezaki |
| 2011/0181492 | A1 | 7/2011 | Soeda |
| 2014/0282753 | A1* | 9/2014 | Li .................... H04N 21/43637 725/81 |
| 2015/0061970 | A1 | 3/2015 | Kim et al. |
| 2015/0200998 | A1* | 7/2015 | Gu .......................... H04L 67/38 709/208 |

FOREIGN PATENT DOCUMENTS

| JP | 2005-184632 | 7/2005 |
| JP | 2008-103806 | 5/2008 |
| JP | 2011-154478 | 8/2011 |
| JP | 2012-048442 | 3/2012 |
| KR | 10-2011-0107058 | 9/2011 |
| KR | 10-2012-0024451 | 3/2012 |
| KR | 10-1218295 | 1/2013 |
| KR | 10-2015-0025584 | 3/2015 |

\* cited by examiner

*Primary Examiner* — Joseph Haley

(57) ABSTRACT

A method of operating an electronic device is provided. The method includes transmitting a plurality of frame information including to a second electronic device having function that can be controlled, determining whether the plurality of frame information have a variance exceeding a predetermined range, and based on the determining, transmitting control information for displaying the plurality of frame information through the second electronic device, by using at least one piece of frame information among transmitted the plurality of frame information.

17 Claims, 13 Drawing Sheets

METHOD AND ELECTRONIC DEVICE FOR PROVIDING FRAME INFORMATION

PRIORITY

The present application is related to and claims the benefit under 35 U.S.C. §119(a) of a Korean patent application No. 10-2014-0038620 filed in the Korean Intellectual Property Office on Apr. 1, 2014, the entire disclosure of which is hereby incorporated by reference.

TECHNICAL FIELD

The present disclosure relate to a method and an electronic device for providing frame information.

BACKGROUND

With the development in the information communication technology and semiconductor technology, various electronic devices are developing into multimedia devices providing various multimedia services. For example, an electronic device may provide multimedia services, such as a voice communication service, a video communication service, a messenger service, a broadcast service, a wireless Internet service, a camera service, and a music reproduction service. Further, an electronic device and another electronic device may provide a multimedia service to each other.

SUMMARY

According to the existing technologies, a first electronic device and a second electronic device may control functions of each other, and the first electronic device may provide the second electronic device with multiple pieces of frame information (e.g. image data relating to each frame, voice data relating to each frame, or control information relating to each frame). To this end, the first electronic device may provide multiple pieces of frame information to the second electronic device, and may consume large amounts of current when providing the multiple pieces of frame information to the second electronic device. According to various embodiments of the present disclosure, the first electronic device and the second electronic device control each other's functions. Further, when it is determined that multiple pieces of frame information, which are to be transmitted or have been transmitted from the first electronic device to the second electronic device, have a variance having a value smaller than or equal to a specified value, the second electronic device may provide frame information stored in at least a part of a display unit functionally connected with the second electronic device using frame information which has been provided by the first electronic device and then stored therein, in the state of interrupting the transmission of the frame information from the first electronic device to the second electronic device.

To address the above-discussed deficiencies, it is a primary object to provide a method for an operation of a first electronic device which includes, transmitting multiple pieces of frame information to a second electronic device having a function that can be controlled, determining whether the multiple pieces of frame information have a variance exceeding a predetermined range, and based on the determining, transmitting control information for displaying, through the second electronic device, at least one piece of frame information among the transmitted multiple pieces of frame information.

According to various embodiments of the present disclosure, a method for an operation of a first electronic device includes receiving a request for interruption of transmission of multiple pieces of frame information for displaying information relating to a function, from a second electronic device, and in response to the request, pausing the transmission of the multiple pieces of frame information for displaying the information relating to the function.

According to various embodiments of the present disclosure, a method for an operation of a second electronic device includes receiving multiple pieces of frame information for displaying information relating to a function, from a first electronic device, receiving, from the first electronic device, a command corresponding to an operation of displaying the multiple pieces of frame information, which are stored, on the second electronic device, and in response to the command, displaying the received multiple pieces of frame information by the second electronic device.

According to various embodiments of the present disclosure, a method for an operation of a second electronic device includes receiving multiple pieces of frame information for displaying information relating to a function, from a first electronic device, determining whether the multiple pieces of frame information have a variance exceeding a predetermined range, and based on the determining, displaying the multiple pieces of frame information, which are stored, by the second electronic device.

According to various embodiments of the present disclosure, a first electronic device includes a processor that determines whether multiple pieces of frame information have a variance exceeding a predetermined range, and a communication module that transmits multiple pieces of frame information to a second electronic device having a function that can be controlled, and based on the determining, transmits control information for displaying, through the second electronic device, at least one piece of frame information among the transmitted multiple pieces of frame information.

According to various embodiments of the present disclosure, a first electronic device includes a communication module that receives a request for interruption of transmission of multiple pieces of frame information for displaying information relating to a function, from a second electronic device, and a processor that, in response to the request, pauses the transmission of the multiple pieces of frame information for displaying the information relating to the function.

According to various embodiments of the present disclosure, a second electronic device includes a communication module that receives, from a first electronic device, multiple pieces of frame information for displaying information relating to a function and receives, from the first electronic device, a command corresponding to an operation of displaying the multiple pieces of frame information, which are stored, on the second electronic device, and a display that, in response to the command, displays the received multiple pieces of frame information by the second electronic device.

According to various embodiments of the present disclosure, a second electronic device includes a communication module that receives multiple pieces of frame information for displaying information relating to a function, from a first electronic device a processor that determines whether the multiple pieces of frame information have a variance exceeding a predetermined range, and a display that displays, based on the determining, the multiple pieces of frame information, which are stored, by the second electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to following description taken in conjunction with the accompanying drawings, in which like reference numerals represent like parts.

DETAILED DESCRIPTION

Figure 1:
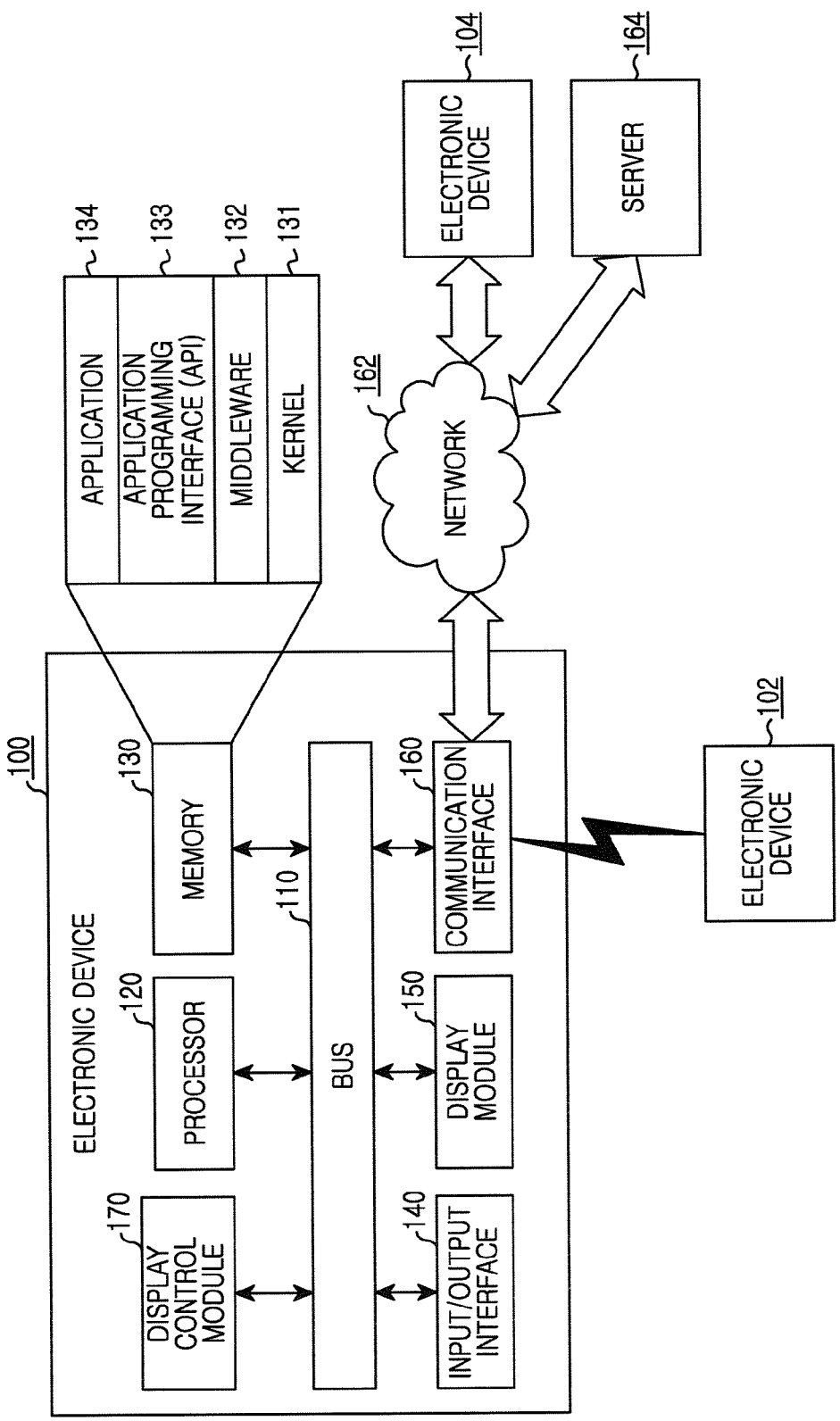
FIG. 1 illustrates a network environment including an electronic device 100 according to various embodiments.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. Hereinafter, the present disclosure will be described with reference to the accompanying drawings. The present disclosure may have various modifications and embodiments and thus will be described in detail with reference to specific embodiments illustrated in the drawings. However, it should be understood that there is no intent to limit the present disclosure to the particular forms disclosed, and on the contrary, the present disclosure is to cover all modifications, equivalents, and/or alternatives falling within the spirit and scope of the disclosure. In description of the drawings, similar elements are indicated by similar reference numerals.

In the present disclosure, the expression "include" or "may include" refers to existence of a corresponding function, operation, or element, and does not limit one or more additional functions, operations, or elements. In the present disclosure, the terms such as "include" and/or "have" may be construed to denote a certain characteristic, number, step, operation, constituent element, element or a combination thereof, but may not be construed to exclude the existence of or a possibility of addition of one or more other characteristics, numbers, steps, operations, constituent elements, elements or combinations thereof.

In the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from the other elements. For example, a first user device and a second user device indicate different user devices although both of them are user devices. For example, a first element could be termed a second element, and similarly, a second element could be also termed a first element without departing from the scope of the present disclosure.

In the case where an element is referred to as being "connected to" or "accessing" other elements, it should be understood that not only the element is directly connected or accessed to the other elements, but also another element may exist between them. Meanwhile, in the case where an element is referred to as being "directly connected to" or "directly accessing" other element, it should be understood that there is no element therebetween.

The terms used in the present disclosure are only used to describe specific embodiments, and are not intended to limit the present disclosure. As used herein, the singular forms are intended to include the plural forms as well, unless the context clearly indicates otherwise.

Unless defined otherwise, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to the present disclosure may be a device including a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g. a Head-Mounted-Device (HMD) such as electronic glasses, electronic clothes, an electronic bracelet, an electronic necklace, an electronic appcessory, electronic tattoos, or a smartwatch).

According to some embodiments, the electronic device may be a smart home appliance with a communication function. The smart home appliance as an example of the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device may include at least one of various medical appliances (e.g. Magnetic Resonance Angiography (MRA), Magnetic Resonance Imaging (MRI), Computed Tomography (CT) machine, move camera, and an ultrasonic machine), navigation devices, Global Positioning System (GPS) receivers, Event Data Recorders (EDRs), Flight Data Recorders (FDRs), automotive infortainment devices, electronic equipments for ships (e.g. navigation equipments for ships, gyrocompasses, or the like), avionics, security devices, head units for vehicles, industrial or home robots, Automatic Teller Machines (ATM) of banking facilities, and Point Of Sales (POSs) of shops.

According to some embodiments, the electronic device may include at least one of a part of furniture or a building/structure having a communication function, an electronic board, an electronic signature receiving device, a projector, and various kinds of measuring instruments (e.g., a water meter, an electric meter, a gas meter, a radio wave meter, and the like). The electronic device according to the present disclosure may be a combination of one or more of the aforementioned various devices. Also, the electronic device according to the present disclosure may be a flexible device. Further, it will be apparent to those skilled in the art that the electronic device according to the present disclosure is not limited to the aforementioned devices.

Hereinafter, an electronic device according to various embodiments will be described with reference to the accompanying drawings. In various embodiments, the term "user" may indicate a person using an electronic device or a device (e.g. an artificial intelligence electronic device) using an electronic device.

FIG. 1 illustrates a network environment including an electronic device 100 according to various embodiments. Referring to FIG. 1, the electronic device 100 may include a bus 110, a processor 120, a memory 130, an input/output interface 140, a display 150, a communication interface 160, and a display control module 170.

The bus 110 may be a circuit which interconnects the above-described elements and delivers a communication (e.g., a control message) between the above-described elements.

For example, the processor 120 may receive instructions from the aforementioned other elements (e.g., the memory 130, the input/output interface 140, the display 150, the communication interface 160, and the display control module 170) through the bus 110, decipher the received instructions, and perform calculation or data processing according to the deciphered instructions.

The memory 130 may store instructions or data received from or created by the processor 120 or other elements (e.g., the input/output interface 140, the display 150, the communication interface 160, or the display control module 170). The memory 130 may include programming modules, such as a kernel 131, middleware 132, an Application Programming Interface (API) 133, an application 134, and the like. The aforementioned programming modules may be formed of software, firmware, hardware, or a combination of at least two thereof.

The kernel 131 may control or manage system resources (e.g., the bus 110, the processor 120, or the memory 130) used for executing an operation or a function implemented in the remaining other programming modules, for example, the middleware 132, the API 133, or the application 134. In addition, the kernel 131 may provide an interface through which the middleware 132, the API 133, or the application 134 may control or manage the individual elements of the electronic device 100 while accessing the individual elements.

The middleware 132 may perform a relay function of allowing the API 133 or the application 134 to communicate with the kernel 131 to exchange data therewith. Furthermore, in regard to task requests received from the applications 134, the middleware 132 may perform a control (e.g., scheduling or load balancing) for the task requests, using a method of allocating at least one of the applications 134 a priority for using the system resources (e.g., the bus 110, the processor 120, and the memory 130) of the electronic device 100.

The API 133 is an interface through which the application 134 may control functions provided by the kernel 131 or the middleware 132, and may include at least one interface or function (e.g., instruction) for file control, window control, image processing, or text control.

According to various embodiments, the applications 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing information on atmospheric pressure, humidity, temperature, and the like). Additionally or alternately, the application 134 may be an application related to the exchange of information between the electronic device 100 and an external electronic device (e.g., an electronic device 104). The application related to the exchange of information may include, for example, a notification relay application for transferring particular pieces of information to the external electronic device or a device management application for managing the external electronic device.

For example, the notification relay application may include a function of transferring, to the external electronic device (e.g., the electronic device 104), notification information generated in other applications of the electronic device 100 (e.g., an SMS/MMS application, an e-mail application, a health management application, an environmental information application, and the like). Additionally or alternatively, the notification relay application may receive notification information from, for example, the external electronic device (e.g., the electronic device 104) and provide the received notification information to a user. For example, the device management application may manage (e.g., install, delete, or update) functions for at least a part of the external electronic device (e.g., the electronic device 104) communicating with the electronic device 100 (e.g., turning on/off the external electronic device itself (or some elements thereof) or adjusting the brightness (or resolution) of a display), applications operating in the external electronic device, or services (e.g., a telephone call service or a message service) provided from the external electronic device.

According to various embodiments, the applications 134 may include an application appointed according to the attribute (e.g., the type) of the external electronic device (e.g., the electronic device 104). For example, in cases where the external electronic device is an MP3 player, the applications 134 may include an application related to the reproduction of music. Similarly, in cases where the external electronic device is a mobile medical appliance, the applications 134 may include an application related to health care. According to one embodiment, the applications 134 may include at least one of an application designated to the electronic device 100 and an application received from the external electronic device (e.g., a server 164 or the electronic device 104).

The input/output interface 140 may transfer instructions or data input from a user through an input/output device (e.g., the sensor, a keyboard, or a touch screen) to, for example, the processor 120, the memory 130, the communication interface 160, or the display control module 170 through the bus 110. For example, the input/output interface 140 may provide, to the processor 120, data for a user's touch input through the touch screen. Furthermore, through the input/output device (e.g., a speaker or a display), the input/output interface 140 may output instructions or data received from the processor 120, the memory 130, the communication interface 160, or the display control module 170 through the bus 110. For example, the input/output interface 140 may output voice data, processed through the processor 120, to a user through a speaker.

The display 150 may display various pieces of information (e.g., multimedia data or text data) to a user.

The communication interface 160 may connect communication between the electronic device 100 and the external electronic device (e.g., the electronic device 104 or the server 164). For example, the communication interface 160 may be connected to a network 162 through wireless or wired communication to communicate with the external device. The wireless communication may include at least one of, for example, Wi-Fi (Wireless Fidelity), Bluetooth (BT), Near Field Communication (NFC), Global Positioning System (GPS) and cellular communication (e.g., Long Term Evolution (LTE), LTE-A, Code Division Multiple Access (CDMA), Wideband CDMA (WCDMA), Universal Mobile Telecommunication System (UMTS), Wireless Broadband (WiBro), and Global System for Mobile communication (GSM)). The wired communication may include at least one of, for example, a Universal Serial Bus (USB), a High Definition Multimedia Interface (HDMI), Recommended Standard 232 (RS-232), and a Plain Old Telephone Service (POTS).

According to one embodiment, the network 162 may be a telecommunication network. The communication network may include at least one of a computer network, the Internet, the Internet of things, and a telephone network. According to one embodiment, a protocol (e.g., a transport layer protocol, data link layer protocol, or a physical layer protocol) for communication between the electronic device 100 and the external device may be supported by at least one of the application 134, the application programming interface 133, the middleware 132, the kernel 131, and the communication interface 160.

The display control module 170 may execute an application programming interface 133 stored in the memory 130 to control a screen sharing function in the first electronic device and the second electronic device. According to various embodiments, the display control module 170 may establish, maintain, or remove a connection for signal and data transmission with a peer device (second electronic device). According to various embodiments, the display control module 170 may manage an internal buffer and an external buffer. According to various embodiments, the display control module 170 may determine which window will display screen data, among the internal window and the external window, and may receive a command therefor.

Figure 2:
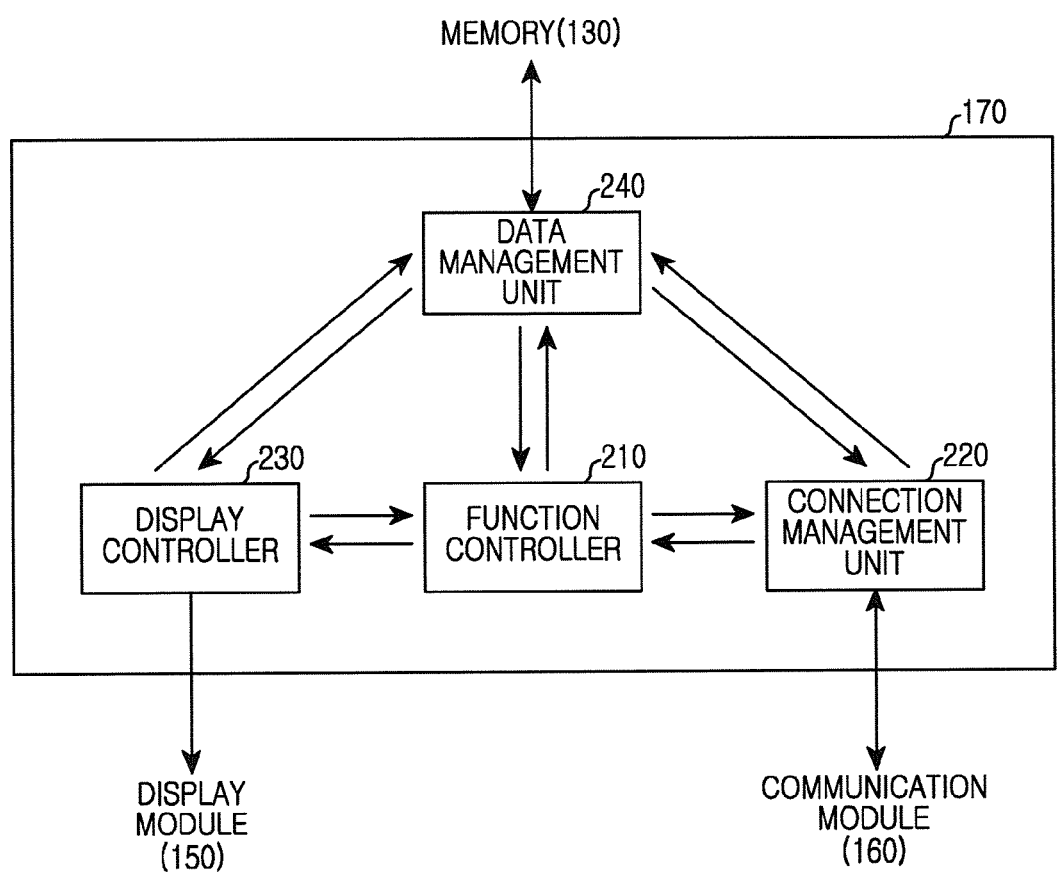
FIG. 2 is a block diagram illustrating a display control module according to various embodiments of the present disclosure.

FIG. 2 is a block diagram illustrating a display control module according to various embodiments of the present disclosure. Referring to FIG. 2, a display control module according to various embodiments of the present disclosure may include a function controller 210, a connection management unit 220, a data management unit 240, and a display controller 230.

According to various embodiments of the present disclosure, the function controller 210 may execute the application programming interface 133 stored in the memory 130 to control a screen sharing function in the first electronic device and the second electronic device. According to various embodiments, the function controller 210 may request the connection management unit 220 to establish or interrupt the connection with a counterpart electronic device and transmit data or interrupt the transmission of data. According to various embodiments, through the display controller 230, the function controller 210 may display data or receive an input relating to the application programming interface 133.

According to various embodiments, the connection management unit 220 may establish, maintain, or remove a connection for signal and data transmission with a peer device (second electronic device) according to a signal from the function controller 210. For example, the connection management unit 220 may take screen data from the external buffer of the data management unit 240 and transmit the screen data to the peer device.

According to various embodiments, the connection management unit 220 may connect communications with a counterpart electronic device by executing a connection management application 134 stored in the memory 130. For example, the connection management unit 220 may establish, maintain, or remove the connection with a counterpart electronic device according to a control of the function controller 210. Further, the connection management unit 220 may request the data management unit 240 to transmit screen data stored in an external buffer to a counterpart electronic device.

According to various embodiments, the data management unit 240 may manage an internal buffer and an external buffer. For example, the data management unit 240 may manage an internal buffer in which screen data displayed by the display controller 230 through the first electronic device is stored, and may manage the external buffer in which screen data to be transmitted to the second electronic device is stored. Further, the data management unit 240 may store a frame in an internal buffer and an external buffer according to a request from the display controller 230.

According to various embodiments, the data management unit 240 may control storage of data, using the external buffer and the internal buffer. For example, the data management unit 240 may store data to be transmitted to a counterpart electronic device in the external buffer and may store data to be displayed on the electronic device in the internal buffer. In this event, the data management unit 240 may store an empty screen (a black image) in the internal buffer and store data to be transmitted to the second electronic device in the external buffer. According to one embodiment, when a screen sharing interruption request has been generated, the data management unit 240 may store an empty screen (a black image) in the external buffer and store data to be displayed on the first electronic device in the internal buffer. According to one embodiment, the data management unit 240 may interrupt the storage of data in the internal buffer and the external buffer.

According to various embodiments, the display controller 230 may determine or receive an instruction indicating which window will display screen data, among an internal window or an external window, and may transmit a result of the determination or the received instruction to the data management unit 240. Further, the display controller 230 may take screen data stored in the data management unit 240 from the internal buffer and then display the taken screen data. According to various embodiments, the display controller 230 may determine which electronic device will display screen data. For example, when the display controller 230 recognizes that the second electronic device will display screen data, the display controller 230 may request the data management unit 240 to store the same data as that stored in the internal buffer in the external buffer, thereby displaying a screen through a display of the second electronic device.

Although not illustrated in the present embodiment, the electronic device (second electronic device) having received the transmitted screen data may include a video frame buffer. The video frame buffer may store a video frame transmitted from the first electronic device. Further, the video frame buffer may operate using the panel self-refresh technology. The panel self-refresh technology will be described in more detail in another embodiment.

Figure 3:
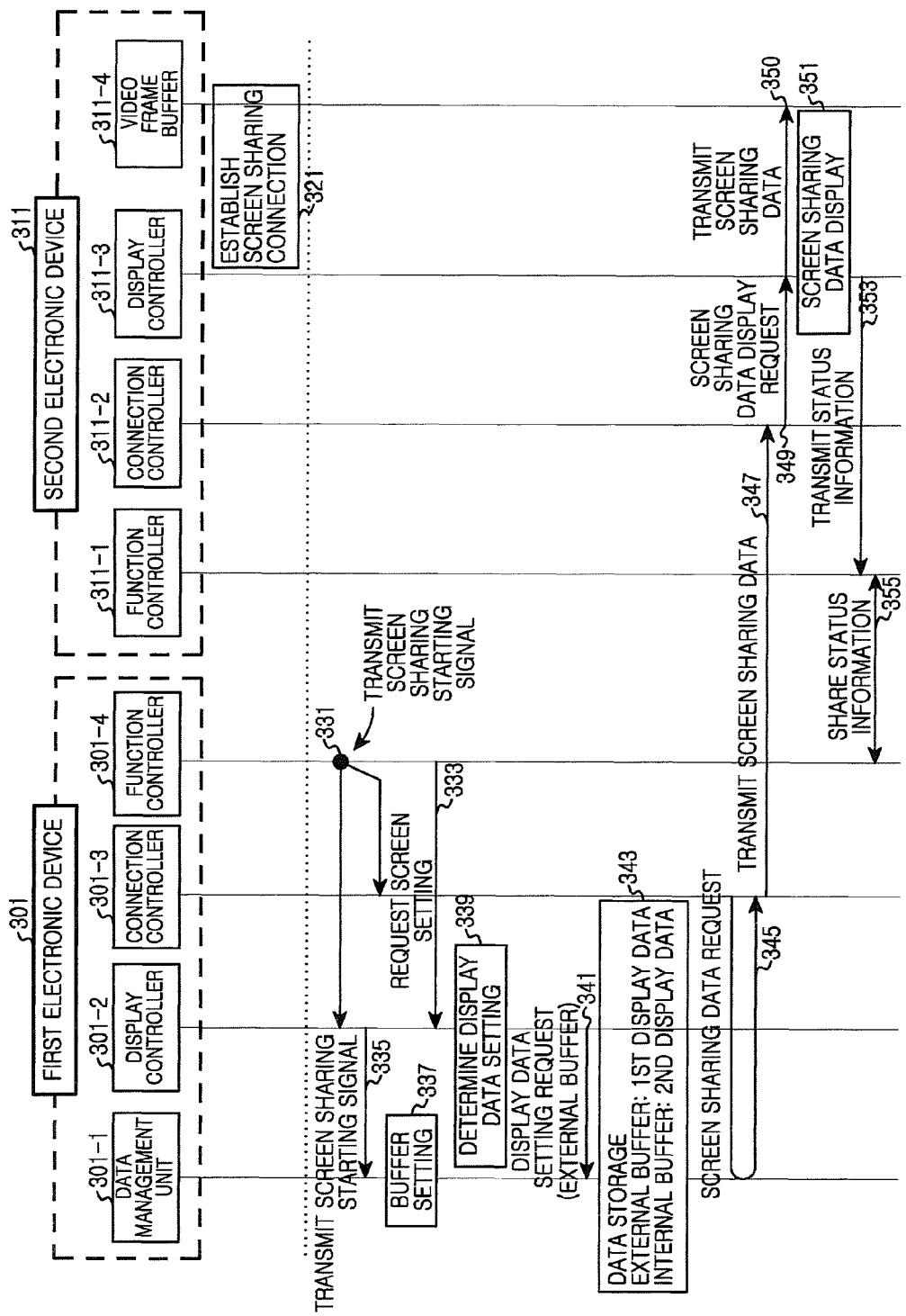
FIG. 3 is a signal flow diagram illustrating a process of inter-controlling functions by a first electronic device and a second electronic device according to various embodiments of the present disclosure and providing the second electronic device with multiple pieces of frame information of the first electronic device.

FIG. 3 is a signal flow diagram illustrating a process of inter-controlling functions by a first electronic device and a second electronic device according to various embodiments of the present disclosure and providing the second electronic device with multiple pieces of frame information of the first electronic device. Referring to FIG. 3, when a screen sharing connection has been established between a first electronic device 301 and a second electronic device 311, a function controller 301-4 of the first electronic device may transmit a signal instructing starting of screen sharing to a display controller 301-2 and a connection controller 301-3 thereof according to various embodiments in operation 331.

According to one embodiment, the display controller 301-2 may receive the signal instructing starting of screen sharing from the function controller 301-4 and transfer the signal instructing starting of screen sharing to a data management unit 301-1 thereof in operation 335.

According to one embodiment, the data management unit 301-1 may enable a buffer for storage of data to be ready in operation 337. For example, the data management unit 301-1 may prepare multiple screens including a screen to be displayed by a first electronic device 301 and a screen to be displayed by a second electronic device 311.

According to one embodiment, the function controller 301-4 may transmit, to the display controller 301-2, a signal instructing setting of a screen in operation 333. For example, the signal instructing setting of a screen may be a signal for configuring the resolution, size, etc. of contents to be displayed by a second electronic device 311.

According to one embodiment, the display controller 301-2 of the first electronic device may receive a signal instructing setting of a screen, check the current window situation or the state (e.g. sleep state or active state) of the electronic device, and turn off a multi-window in operation 339. As used herein, a single window may refer to, for example, a screen window to be shared, which can be displayed on only a part of the second electronic device 311, while the multi-window may refer to, for example, screen windows to be shared, which can be displayed either on at least a part of or sequentially on the first electronic device 301 and the second electronic device 311. In the present embodiment, when receiving a signal instructing setting of a single window from the function controller 301-4, the display controller 301-2 can turn off the multi-window. According to one embodiment, the display controller 301-2 may request data from the data management unit 301-1 in operation 341. For example, the display controller 301-2 may notify the data management unit 301-1 of which window will display data.

According to one embodiment, the data management unit 301-1 may store data in an internal buffer or an external buffer in operation 343. For example, when the data management unit 301-1 receives, from the display controller 301-2, a request to display a frame in the external window, the data management unit 301-1 may store multiple pieces of frame information or screen sharing data in order to display function-related information in the external buffer. As another example, the data management unit 301-1 may store a black image in the internal buffer.

According to one embodiment, the connection controller 301-3 may acquire data stored in the external buffer of the data management unit 301-1 in operation 345.

According to one embodiment, the connection controller 301-3 may acquire data stored in the data management unit 301-1 and transmit screen sharing data to the second electronic device 311. For example, the connection controller 301-3 of the first electronic device may transmit, to a connection controller 311-2 of the second electronic device, information on multiple frames or screen sharing data in order to display function-related information in operation 347.

According to one embodiment, the connection controller 311-2 of the second electronic device may transmit the received screen sharing data to a display controller 311-3 thereof in operation 349. Further, the connection controller 311-2 may transmit the received screen sharing data to a video frame buffer 311-4 in operation 350. The video frame buffer 311-4 may store in real time the screen sharing data received from the display controller 311-3.

According to one embodiment, the display controller 311-3 may acquire the screen sharing data from the connection controller 311-2 and display the screen sharing data on a display unit of the second electronic device in operation 351.

According to one embodiment, when the screen sharing starts, the display controller 311-3 may transmit, to a function controller 311-1, information on the single mode or multi-mode and the status information, such as sleep or active state, of the current state to the first electronic device in operation 353.

According to one embodiment, the function controller 311-1 of the second electronic device may be synchronized with the function controller 301-4 of the first electronic device by identifying the current states of the first electronic device and the second electronic device in operation 355.

FIGS. 4A, 4B, 4C and 4D illustrate embodiments in which the second electronic device uses a sidesync function after the screen sharing between the first electronic device and the second electronic device is completed according to various embodiments of the present disclosure. Sidesync is a function which enables one of more of screens, windows, data, inputs (e.g., keyboard, mouse, touch, etc.) to be shared and/or synchronized between devices. Hereinafter, a case where the second electronic device receives screen sharing data transmitted from the first electronic device and displays a screen shared in a display module of the second electronic device will be described.

According to various embodiments, the second electronic device may display, on a display module of the second electronic device, a screen shared between the second electronic device and the first electronic device. For example, the second electronic device may display the screen shared between the second electronic device and the first electronic device on at least a part of a display module functionally connected with the second electronic device, or may display an application being executed in the second electronic device, together with the shared screen, on at least a part of the display module functionally connected with the second electronic device according to various embodiments.

According to various embodiments, the second electronic device may determine whether function-related information has been input. Here, the function-related information may be information relating to a sidesync function. For example, referring to FIGS. 4A and 4B, the second electronic device displays a web browser screen 401, which the second electronic device receives from the first electronic device, on at least a part of a display module functionally connected with the second electronic device, and a first application may be executed on the other part.

In the example described above, the second electronic device may receive an input of selecting an area marked with "NEWS" in a web browser screen 401 provided by the first electronic device. According to various embodiments, the second electronic device may request function-related information, on the basis of the marked area selected by the first electronic device. According to various embodiments, the second electronic device may request the first electronic device to transmit details of the "NEWS" selected by the first electronic device, and the first electronic device may provide the second electronic device with the details of the "NEWS" in response to the request from the second electronic device.

According to various embodiments, the second electronic device may receive the function-related information from the first electronic device and perform operations relating to the function-related information. According to various embodiments, the second electronic device may receive the details of the "NEWS" provided by the first electronic device and display the details of the "NEWS" on the display module of the second electronic device.

Figure 4A:
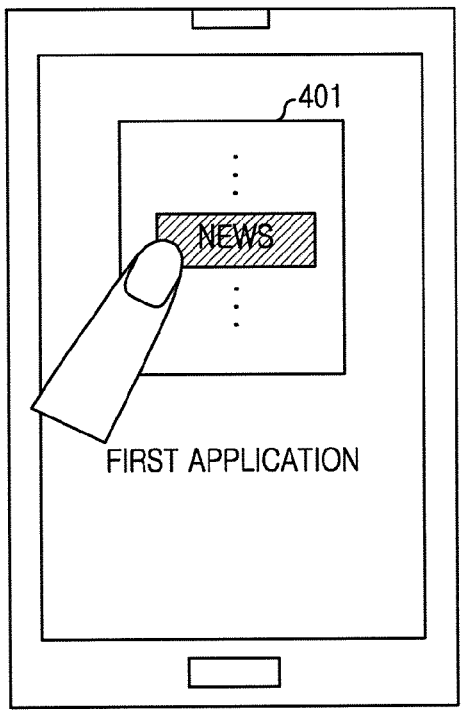
FIGS. 4A, 4B, 4C and 4D illustrate embodiments in which the second electronic device uses a sidesync function after the screen sharing between the first electronic device and the second electronic device is completed according to various embodiments of the present disclosure.
Figure 4B:
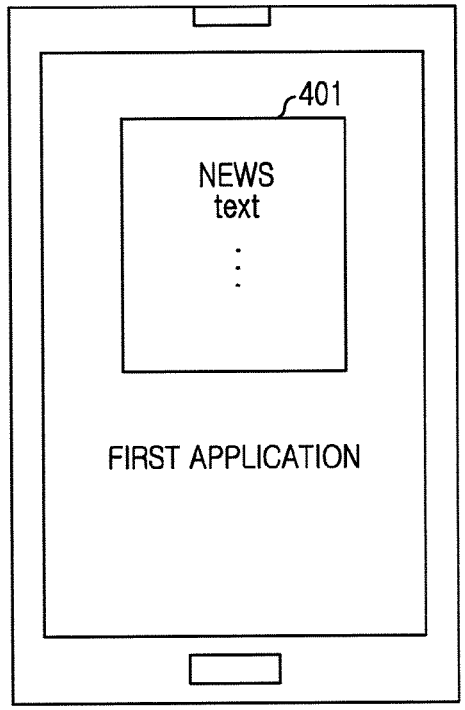
Figure 4C:
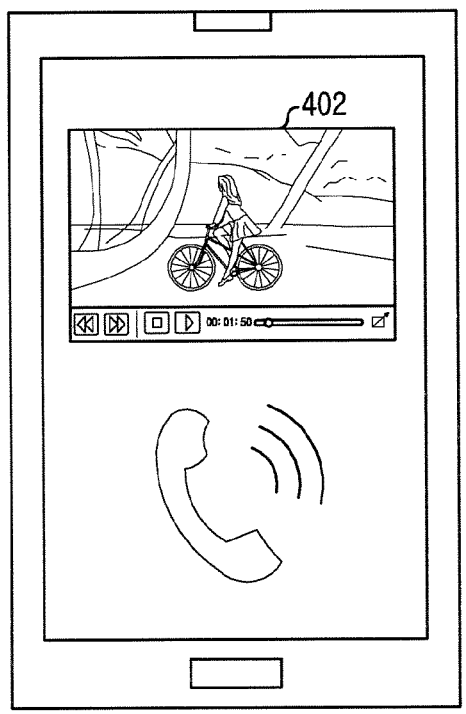
Figure 4D:

A case where the second electronic device displays a video screen 402, which is shared between the second electronic device and the first electronic device, on at least a part of a display module functionally connected with the second electronic device, and another application is not executed on the other part according to various embodiments will be described with reference to FIGS. 4C and 4D.

According to various embodiments, the second electronic device may request function-related information, on the basis of the marked area selected by the first electronic device. According to various embodiments, the second electronic device may identify execution of a phone application and request a call to a third electronic device in a state of displaying the video screen 402 shared between the second electronic device and the first electronic device.

According to various embodiments, the second electronic device may receive the function-related information from the first electronic device and identify the execution of operations relating to the function-related information. According to various embodiments, the second electronic device may try to communicate with the third electronic device in the state where the second electronic device has received the call connection with the third electronic device and displays a screen shared between the second electronic device and the first electronic device.

Figure 5:
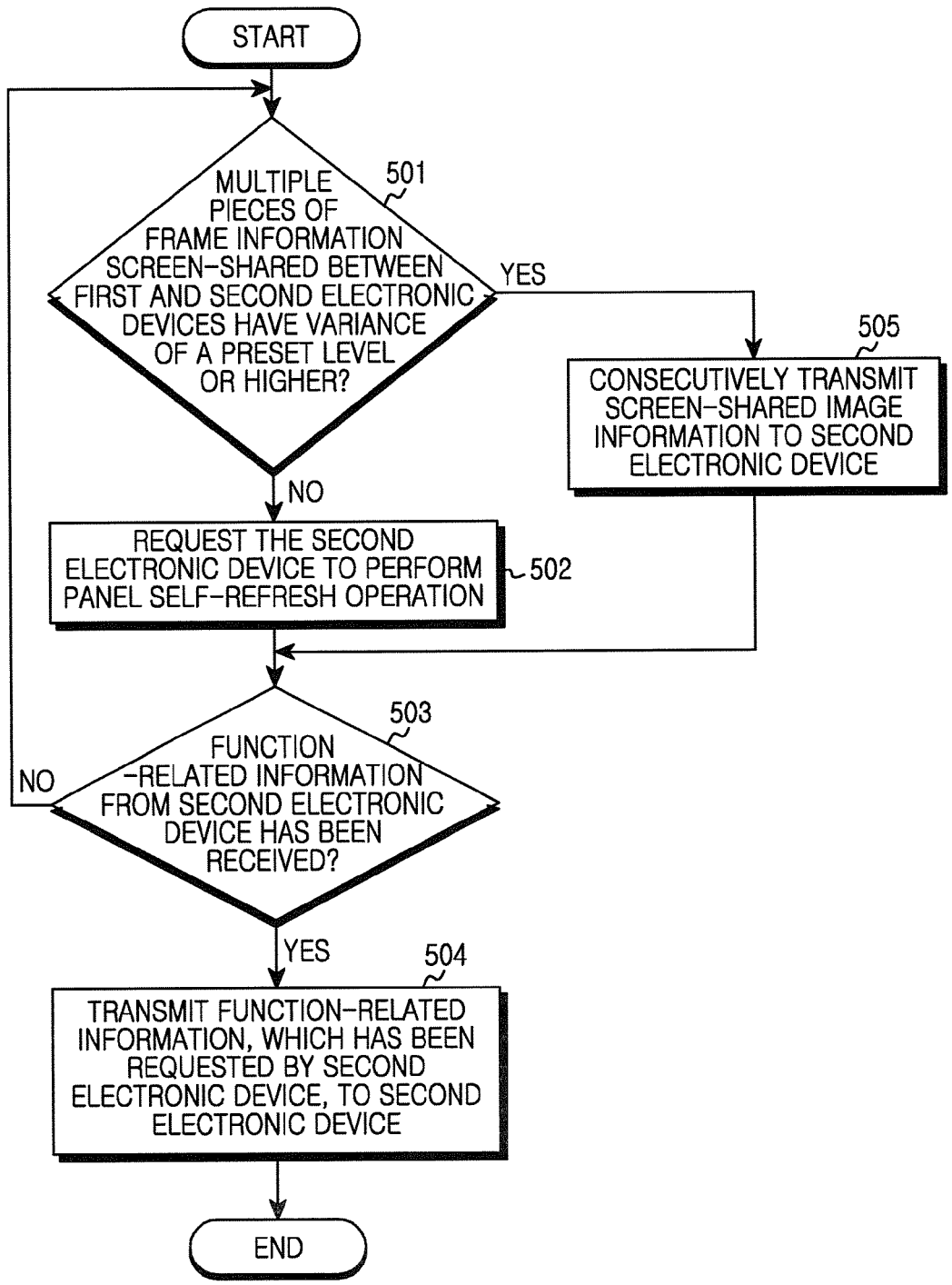
FIG. 5 is a flowchart illustrating an operation method of a first electronic device according to various embodiments of the present disclosure.

FIG. 5 is a flowchart illustrating an operation method of a first electronic device according to various embodiments of the present disclosure. The following description is based on a premise that the first electronic device and the second electronic device share a screen.

In operation 501, the first electronic device may determine whether multiple pieces of frame information shared between the first electronic device and the second electronic device have a variance of a preset level or higher. According to various embodiments, the first electronic device may determine whether image information of N frames and image information of (N+1) frames, which are being or will be transmitted to the second electronic device, have a variance of a preset level or higher. According to various embodiments, the first electronic device may determine whether pixels included in the image information of N frames and the image information of (N+1) frames have co-identity, by determining whether the pixels have a difference of a specified number of bits or more. According to various embodiments, the first electronic device may determine whether colors included in the image information of N frames and the image information of (N+1) frames have co-identity, by determining whether variance between the colors is of a predetermined value or larger. According to various embodiments, the first electronic device may determine, frame by frame, whether the image information of N frames and the image information of (N+1) frames have co-identity therebetween.

In operation 502, when the first electronic determines that multiple pieces of frame information shared between the first electronic device and the second electronic device do not have a variance of a preset level or higher, the first electronic device may request the second electronic device to perform a panel self-refresh operation. According to various embodiments, the panel self-refresh operation may be an operation of the second electronic device displaying a most recently stored frame among a plurality of frames stored in the second electronic device. According to various embodiments, when the first electronic determines that frame information shared between the first electronic device and the second electronic device does not have a variance of a preset level or higher, the first electronic device may identify that multiple frames being transmitted to the second electronic device are unchanged multiple frames. According to various embodiments, the second electronic device may display a most recently stored frame among a plurality of frames stored in the second electronic device, in order to reduce power consumption by each of the first electronic device and the second electronic device.

In operation 503, the first electronic device may determine whether the first electronic device has received function-related information from the second electronic device. According to various embodiments, the function-related information may be information related to a sidesync function and the first electronic device may receive information related to a sidesync function from the second electronic device.

In operation 504, when the first electronic device has received the function-related information from the second electronic device, the first electronic device may transmit data or information, which has been requested by the second electronic device and corresponds to the function-related information, to the second electronic device. For example, when the first electronic device has received a request for a call connection with a third electronic device from the second electronic device, the first electronic device may connect a call with the third electronic device and may transmit data or information relating to the connected call to the second electronic device.

In operation 505, when the first electronic device has determined in operation 501 that consecutive frame information shared between the first electronic device and the second electronic device have a variance of a preset level or higher, the first electronic device may consecutively transmit the screen-shared image information to the second electronic device. According to various embodiments, when the first electronic determines that consecutive frame information screen-shared between the first electronic device and the second electronic device have a variance of a preset level or higher, the first electronic device may transmit N frames to the second electronic device and then determine whether image information of (N+1) frames and image information of (N+2) frames have a variance of a preset level or higher or determine frame by frame whether image information of N frames and image information of (N+1) frames have co-identity.

When the first electronic has determined in operation 503 that the first electronic device does not have received the function-related information from the second electronic device, the first electronic device may repeat the operation of determining whether the consecutive frame information has a variance of a preset level or higher.

Figure 6:
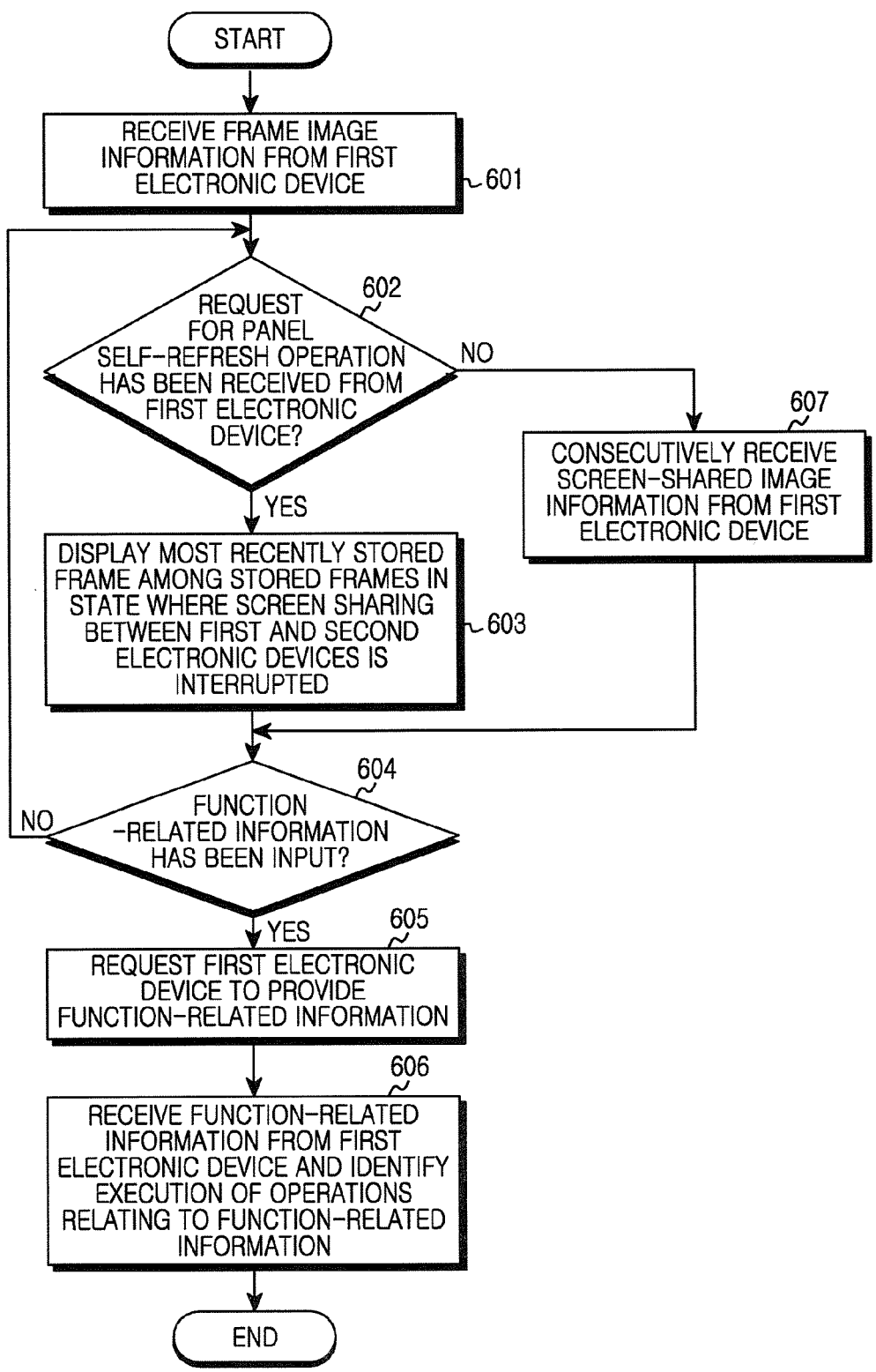
FIG. 6 is a flowchart illustrating an operation of a second electronic device according to various embodiments of the present disclosure.

FIG. 6 is a flowchart illustrating an operation of a second electronic device according to various embodiments of the present disclosure. The following description is based on a premise that the first electronic device and the second electronic device share a screen.

In operation 601, the second electronic device may receive frame image information from the first electronic device. According to various embodiments, the second electronic device may receive, from the first electronic device, screen data relating to a screen to be shared between the first electronic device and the second electronic device, frame image information thereof, or function-related information.

In operation 602, the second electronic device may determine whether the second electronic device has received a request for a panel self-refresh operation from the first electronic device. According to various embodiments, the panel self-refresh operation may be an operation of the second electronic device displaying a most recently stored frame among a plurality of frames stored in the second electronic device. According to various embodiments, when the first electronic device determines that frame information shared between the first electronic device and the second electronic device does not have a variance of a preset level or higher, the first electronic device may identify that frames being transmitted to the second electronic device are not consecutive frames but still frames. According to various embodiments, in order to reduce the amount of power consumed by each of the first electronic device and the second electronic device, the second electronic device may receive, from the first electronic device, a request for a panel self-refresh operation for displaying a most recently stored frame among a plurality of frames stored in the second electronic device.

In operation 603, when the second electronic device has determined that the second electronic device has received a request for a panel self-refresh operation from the first electronic device, the second electronic device may display a most recently stored frame among a plurality of stored frames in a state where the screen sharing between the first electronic device and the second electronic device is interrupted. According to various embodiments, when the second electronic device has determined that the second electronic device has received a request for a panel self-refresh operation from the first electronic device, the second electronic device may display a most recently stored frame.

In operation 604, the second electronic device may determine whether function-related information has been input. According to various embodiments, the function-related information may be information relating to a sidesync function. According to various embodiments, the second electronic device may determine whether the second electronic device has received information relating to a sidesync function by a user's input.

In operation 605, when the second electronic device has determined that the second electronic device has received the input function-related information, the second electronic device may request the first electronic device to provide the function-related information. For example, when the second electronic device has detected a motion of a user trying to enlarge an area of a web browser screen shared between the second electronic device and the first electronic device, the second electronic device may request the first electronic device to provide an enlarge image of the area selected by the user.

In operation 606, the second electronic device may receive function-related information from the first electronic device and identify the execution of operations relating to the function-related information. In the example described above, the second electronic device may identify the enlargement of the selected area by receiving data of the enlarged image of the area selected by the user from the first electronic device.

In operation 607, when the second electronic device has determined that the second electronic device has not received a request for a panel self-refresh operation from the first electronic device, the second electronic device may consecutively receive the screen-shared image information from the first electronic device. According to various embodiments, when the second electronic determines that consecutive frame information screen-shared between the first electronic device and the second electronic device does not have a variance of a preset level or higher, the second electronic device may transmit N frames to the first electronic device and then determine whether image information of (N+1) frames and image information of (N+2) frames have a variance of a preset level or higher or determine frame by frame whether image information of N frames and image information of (N+1) frames have co-identity. When the second electronic device has determined in operation 604 that the second electronic device has not received function-related information input by a user, the second electronic device may repeat the operation of determining whether the second electronic device has received a request for a panel self-refresh operation from the first electronic device.

Figure 7:
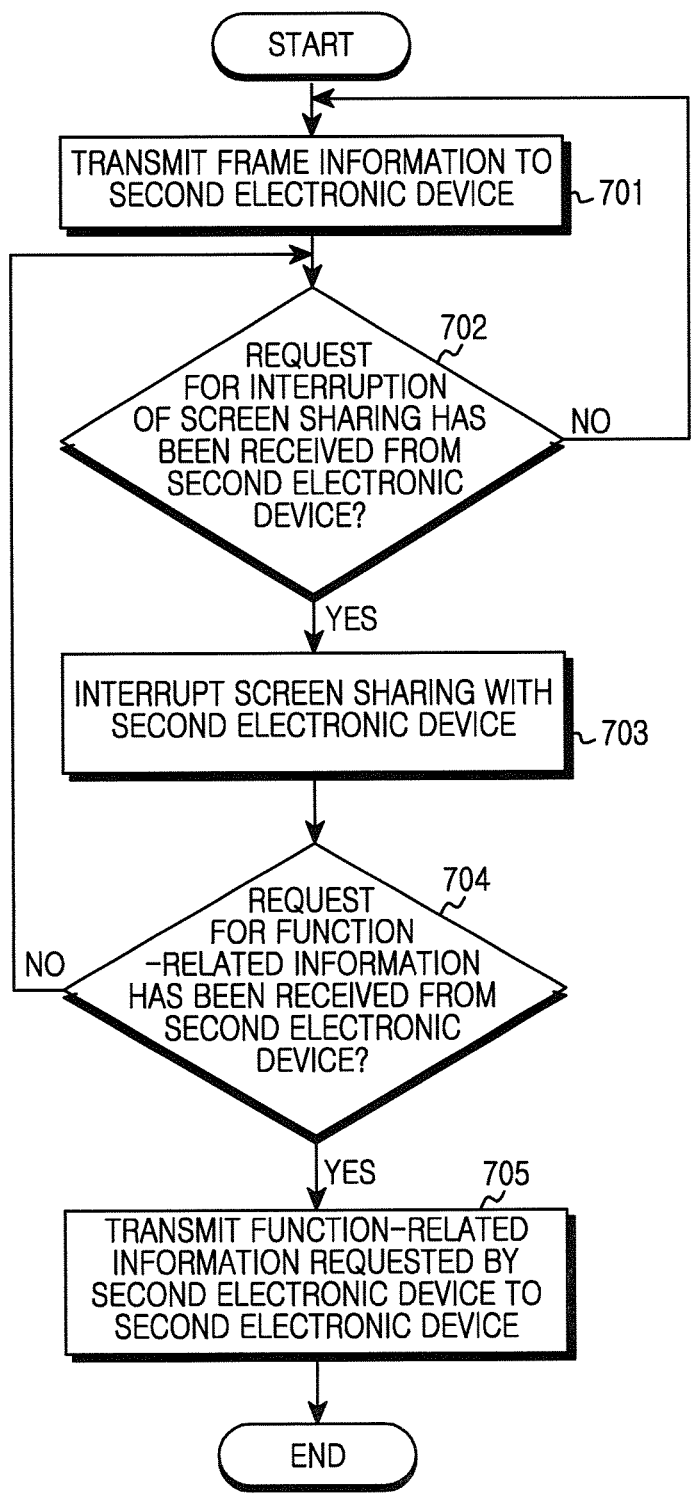
FIG. 7 is a flowchart illustrating an operation of a first electronic device according to various embodiments of the present disclosure.

FIG. 7 is a flowchart illustrating an operation of a first electronic device according to various embodiments of the present disclosure. The following description is based on a premise that the first electronic device and the second electronic device share a screen.

In operation 701, the first electronic device may transmit frame information to the second electronic device. According to various embodiments, the first electronic device may consecutively transmit frame information, such as image information of N frames and image information of (N+1) frames, in order to consecutively share a screen with the second electronic device.

In operation 702, the first electronic device may determine whether the first electronic device has received a request for interruption of the screen sharing from the second electronic device. The second electronic device determines whether the shared image information has a variance of a preset level or higher. According to various embodiments, when the second electronic determines that image information shared between the first electronic device and the second electronic device has a variance of a preset level or higher, the first electronic device may receive a request for interruption of the screen sharing from the second electronic device.

In operation 703, when the first electronic device has received a request for interruption of the screen sharing from the second electronic device, the first electronic device may interrupt the screen sharing with the second electronic device. According to various embodiments, instead of the first electronic device consecutively transmitting frames to the second electronic device in order to share a screen, the second electronic device may achieve the screen sharing by using frames stored in the second electronic device. Therefore, the first electronic device can interrupt the screen sharing with the second electronic device.

In operation 704, the first electronic device may determine whether the first electronic device has received a request for function-related information from the second electronic device. According to various embodiments, the function-related information may be information relating to a sidesync function. According to various embodiments, the first electronic device may determine whether the first electronic device has received information relating to a sidesync function from the second electronic device.

In operation 705, when the first electronic device has determined that the first electronic device has received a request for the function-related information from the second electronic device, the first electronic device may transmit the function-related information requested by the second electronic device to the second electronic device. For example, when the first electronic device has received a request for call connection with a third electronic device from the second electronic device, the first electronic device may connect a call with the third electronic device and may transmit the connected call to the second electronic device.

When it is determined in operation 702 that the first electronic device has not received a request for interruption of the screen sharing from the second electronic device, the first electronic device may repeat the operation of transmitting frame information to the second electronic device.

When it is determined in operation 704 that the first electronic device has not received a request for function-related information from the second electronic device, the first electronic device may repeat the operation of determining whether the first electronic device has received a request for interruption of the screen sharing from the second electronic device.

Figure 8:
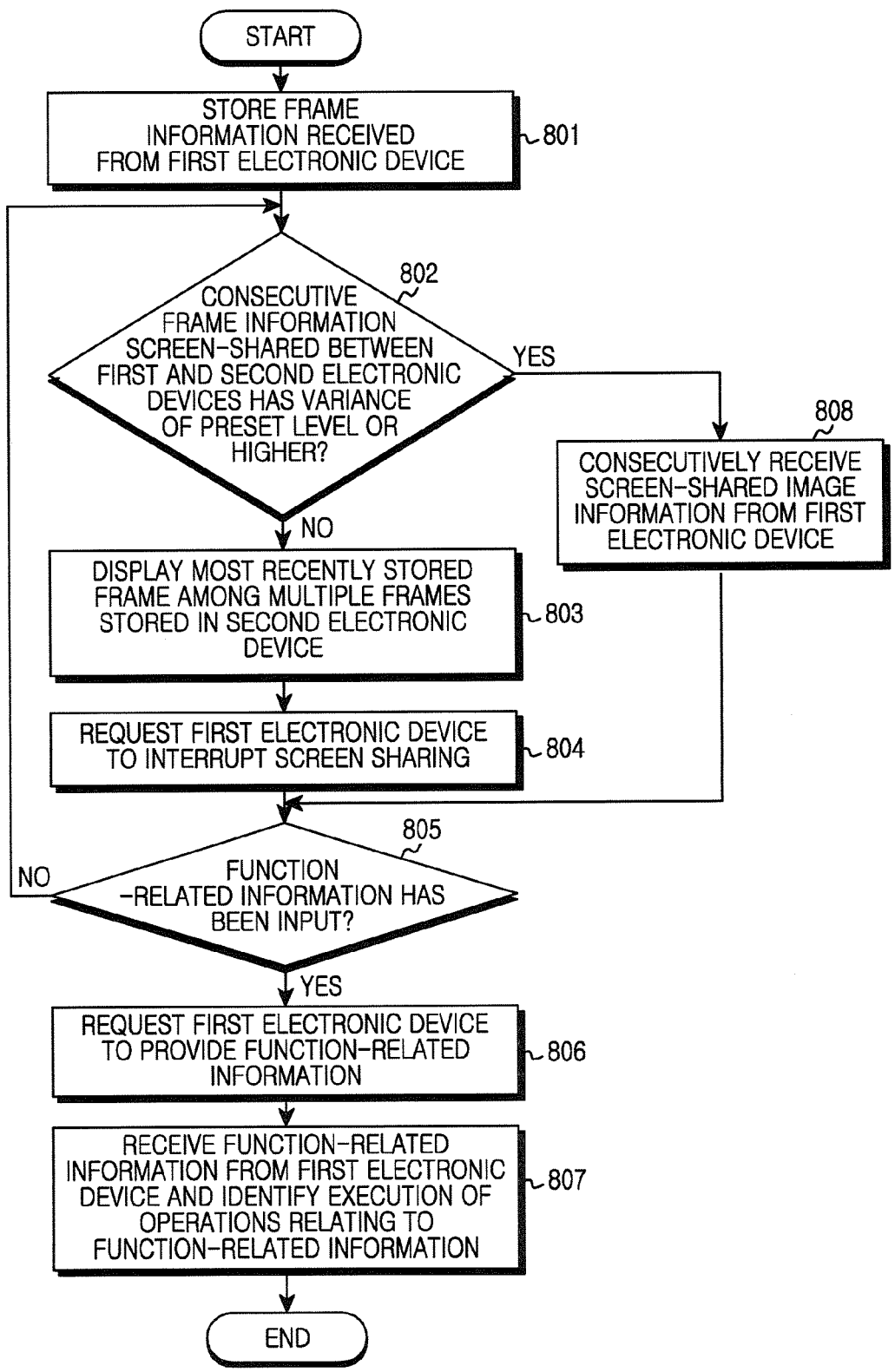
FIG. 8 is a flowchart illustrating an operation of a second electronic device according to various embodiments of the present disclosure.

FIG. 8 is a flowchart illustrating an operation of a second electronic device according to various embodiments of the present disclosure. The following description is based on a premise that the first electronic device and the second electronic device share a screen.

In operation 801, the second electronic device may store frame information received from the first electronic device. According to various embodiments, the second electronic device may store image information of N frames received from the first electronic device and then consecutively store image information of (N+1) frames received from the first electronic device. According to various embodiments, the second electronic device may display a related image of N frames received from the first electronic device on a display module and then consecutively display a related image of (N+1) frames received from the first electronic device on the display module.

In operation 802, the second electronic device may determine whether consecutive frame information screen-shared between the first electronic device and the second electronic device has a variance of a preset level or higher. According to various embodiments, the second electronic device may determine whether image information of N frames and image information of (N+1) frames, which are received from the first electronic device, have a variance of a preset level or higher. For example, the second electronic device may determine whether pixels included in the image information of N frames and the image information of (N+1) frames have co-identity, by determining whether the pixels have a difference of a specified number of bits or more. According to various embodiments, the second electronic device may determine whether colors included in the image information of N frames and the image information of (N+1) frames have co-identity, by determining whether variance between the colors is of a predetermined value or larger.

In operation 803, when the first electronic has determined that consecutive frame information shared between the first electronic device and the second electronic device does not have a variance of a preset level or higher, the second electronic device may display a most recently stored frame among a plurality of frames stored in the second electronic device. According to various embodiments, when the second electronic device has determined that the second electronic device has received a request for a panel self-refresh operation from the first electronic device, the second electronic device may display a most recently stored frame.

In operation 804, the second electronic device may request the first electronic device to interrupt the screen sharing. According to various embodiments, using frame information stored in the second electronic device, the second electronic device can display a screen shared between the second electronic device and the first electronic device. Therefore, the second electronic device may request the first electronic device to interrupt the screen sharing.

In operation 805, the second electronic device may determine whether function-related information has been input. According to various embodiments, the function-related information may be information relating to a sidesync function. According to various embodiments, the second electronic device may determine whether the second electronic device has received information relating to a sidesync function by a user's input.

In operation 806, when the second electronic device has determined that the second electronic device has received the input function-related information, the second electronic device may request the first electronic device to provide the function-related information. For example, when the second electronic device has detected a motion of a user trying to reduce an area of a web browser screen shared between the second electronic device and the first electronic device, the second electronic device may request the first electronic device to provide a reduced image of the area selected by the user.

In operation 807, the second electronic device may receive function-related information from the first electronic device and identify the execution of operations relating to the function-related information. In the example described above, the second electronic device may identify the reduction of the selected area by receiving data of the reduced image of the area selected by the user from the first electronic device.

When the first electronic has determined in operation 802 that consecutive frame information shared between the first electronic device and the second electronic device have a variance of a preset level or higher, the second electronic device may consecutively receive the screen-shared image information from the first electronic device in operation 808. According to various embodiments, when the second electronic has determined that image information shared between the first electronic device and the second electronic device does not have a variance of a preset level or higher, the second electronic device may transmit image information of (N+2) frames to the first electronic device.

When the second electronic device has determined in operation 805 that the second electronic device has not received function-related information input by a user, the second electronic device may repeat the operation of determining whether the information of the consecutive frames screen-shared with the first electronic device has a variance of a preset level or higher.

Figure 9:
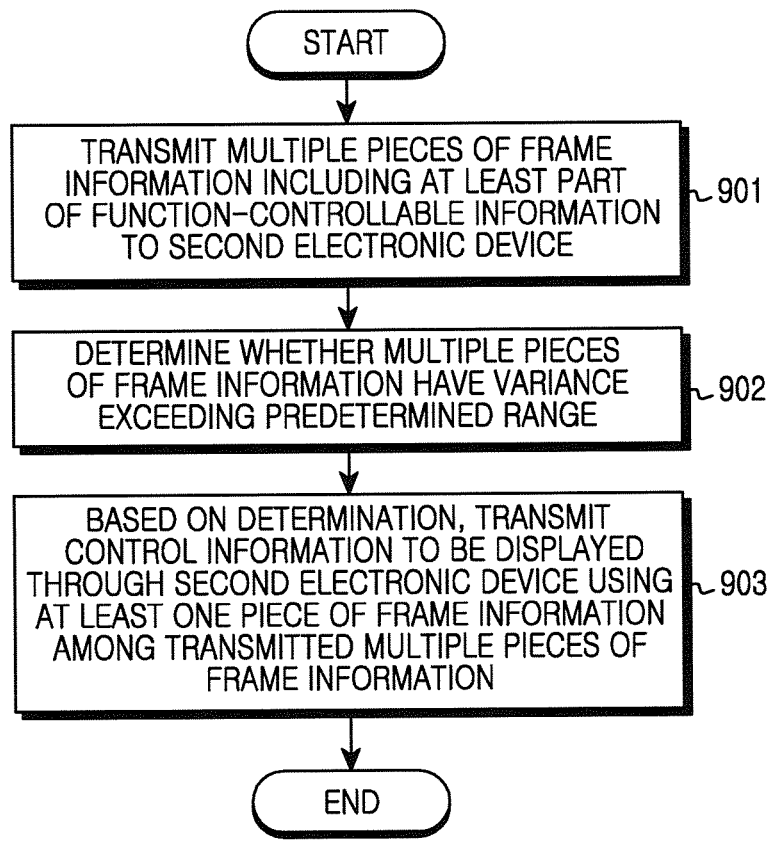
FIG. 9 is a flowchart illustrating an operation method of a first electronic device according to various embodiments of the present disclosure.

FIG. 9 is a flowchart illustrating a method of a first electronic device according to various embodiments of the present disclosure. In operation 901, the first electronic device may transmit multiple pieces of frame information including at least a part of function-controllable information to the second electronic device.

In operation 902, the first electronic device may determine whether the multiple pieces of frame information have a variance exceeding a predetermined range.

In operation 903, on the basis of the above determination, the first electronic device may transmit control information to be displayed through the second electronic device using at least one piece of frame information among the transmitted multiple pieces of frame information.

Figure 10:
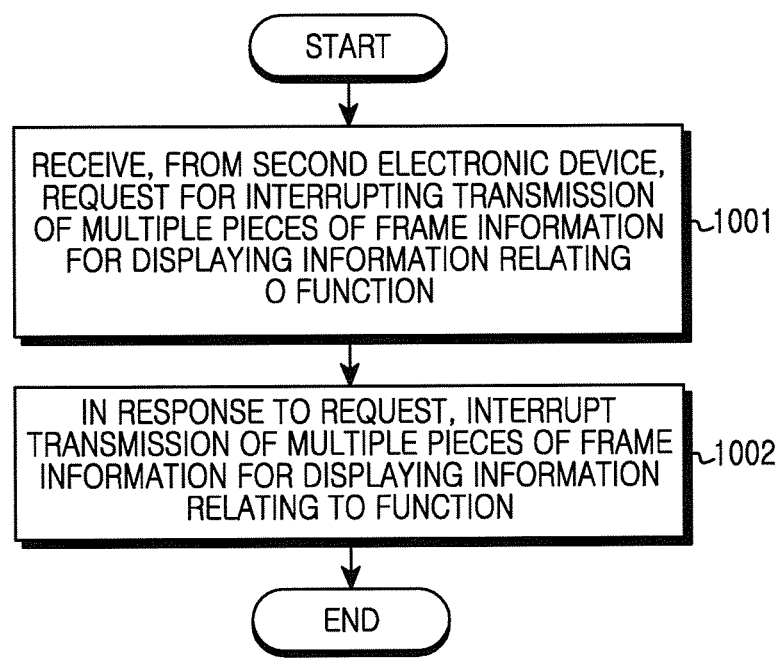
FIG. 10 is a flowchart illustrating an operation method of a first electronic device according to various embodiments of the present disclosure.

FIG. 10 is a flowchart illustrating an operation method of a first electronic device according to various embodiments of the present disclosure. In operation 1001, the first electronic device may receive, from the second electronic device, a request for interrupting transmission of the multiple pieces of frame information for displaying information relating to the function.

In operation 1002, in response to the request, the first electronic device may interrupt the transmission of the multiple pieces of frame information for displaying information relating to a function.

Figure 11:
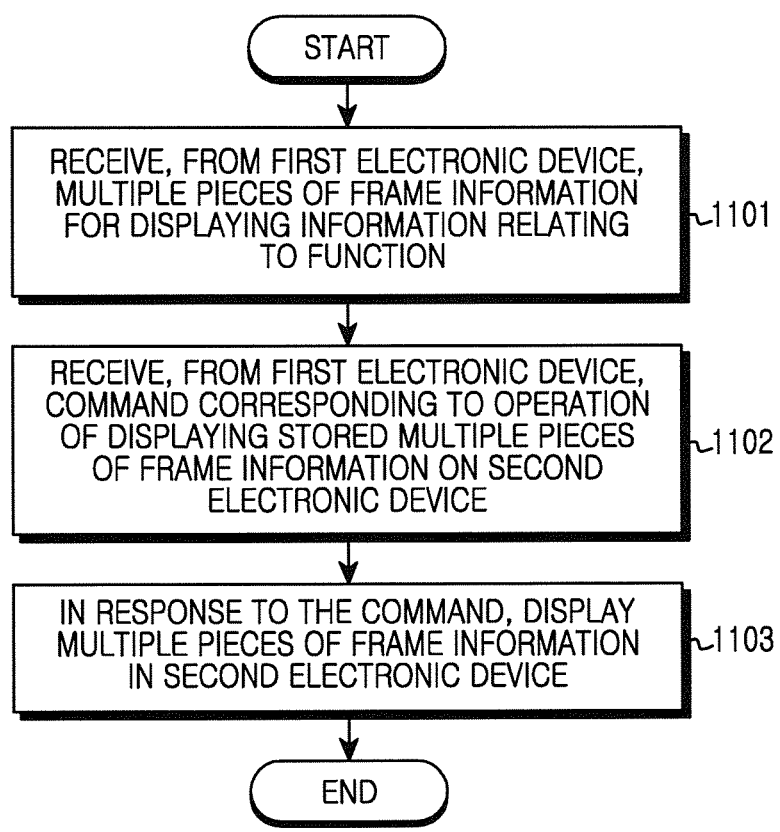
FIG. 11 is a flowchart illustrating an operation method of a second electronic device according to various embodiments of the present disclosure.

FIG. 11 is a flowchart illustrating an operation method of a second electronic device according to various embodiments of the present disclosure. In operation 1101, the second electronic device may receive, from the first electronic device, multiple pieces of frame information for displaying information relating to a function.

In operation 1102, the second electronic device may receive, from the first electronic device, a command corresponding to an operation of displaying the stored multiple pieces of frame information on the second electronic device.

In operation 1103, in response to the command, the second electronic device may display the multiple pieces of frame information in the second electronic device.

Figure 12:
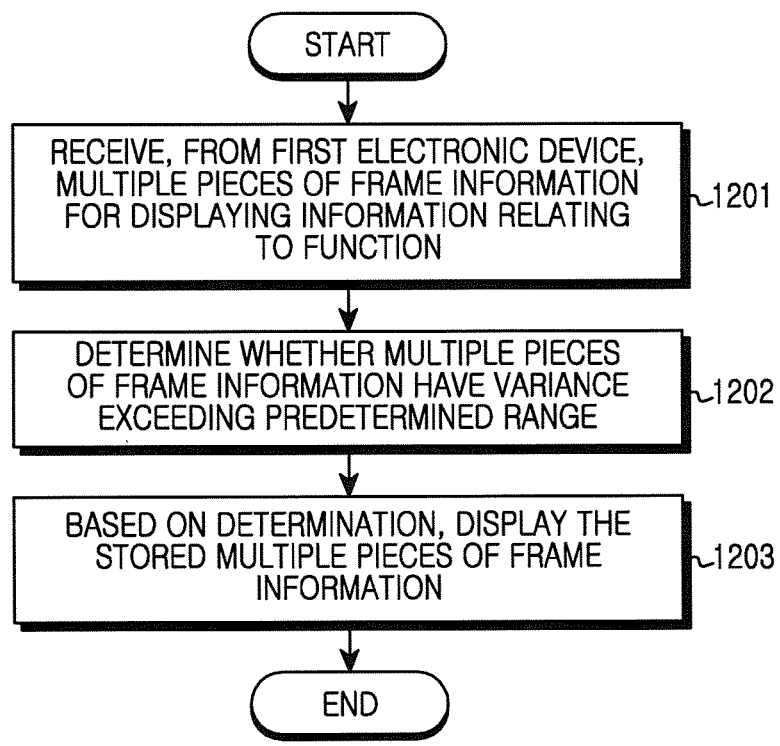
FIG. 12 is a flowchart illustrating an operation a method of a second electronic device according to various embodiments of the present disclosure.

FIG. 12 is a flowchart illustrating an operation method of a second electronic device according to various embodiments of the present disclosure. In operation 1201, the second electronic device may receive, from the first electronic device, multiple pieces of frame information for displaying information relating to a function.

In operation 1202, the second electronic device may determine whether the multiple pieces of frame information have a variance exceeding a predetermined range.

In operation 1203, on the basis of the determination, the second electronic device may display the stored multiple pieces of frame information.

Figure 13:
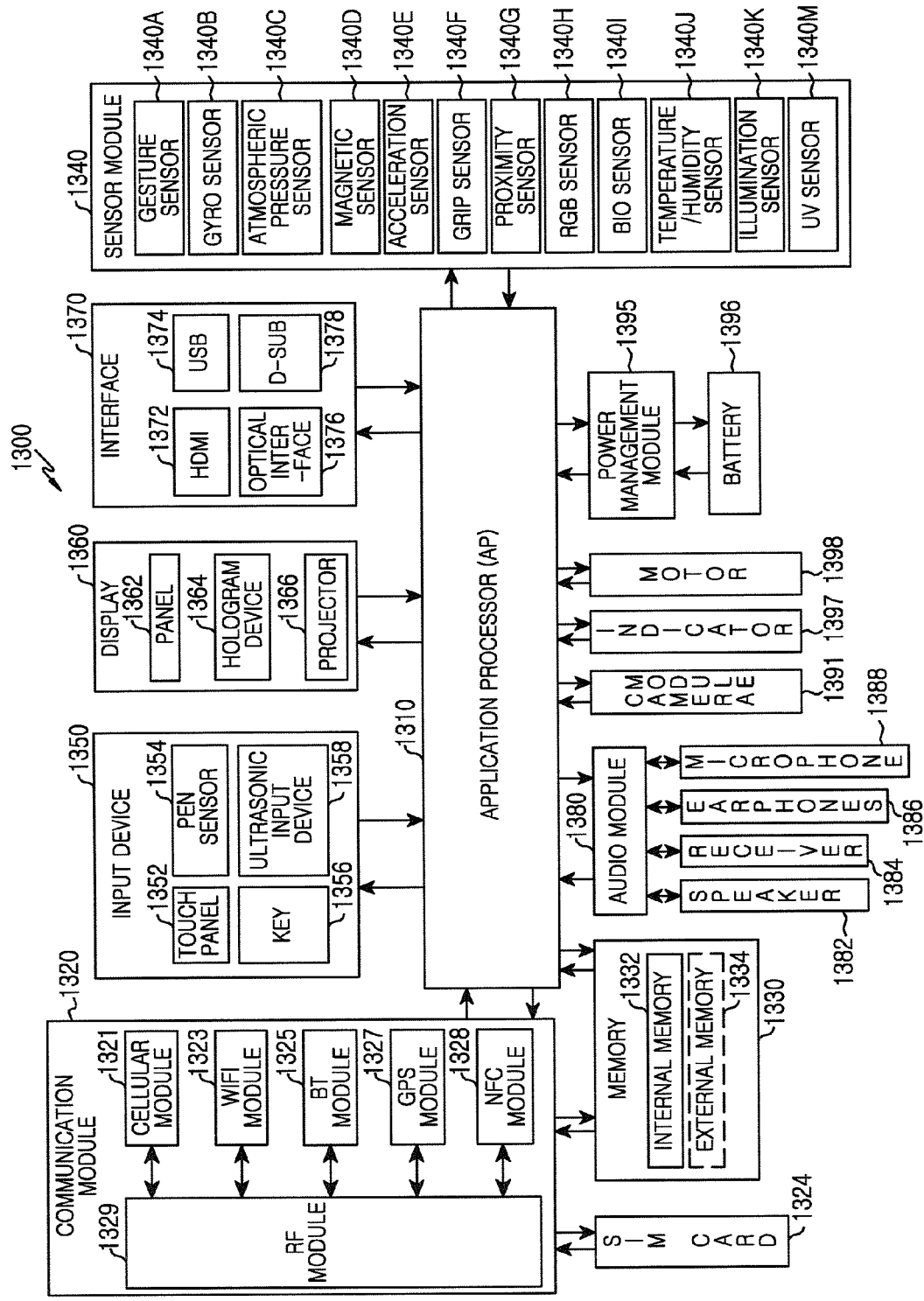
FIG. 13 is a block diagram illustrating hardware according to an embodiment of the present disclosure.

FIG. 13 is a block diagram illustrating hardware that may be present in one or more of the electronic devices discussed herein according to an embodiment of the present disclosure. The electronic device 1300 may configure, for example, the whole or a part of the electronic device 100 illustrated in FIG. 1. The electronic device 1300 may include at least one Application Processor (AP) 1310, a communication module 1320, a Subscriber Identifier Module (SIM) card 1324, a memory 1330, a sensor module 1340, an input device 1350, a display 1360, an interface 1370, an audio module 1380, a camera module 1391, a power management module 1395, a battery 1396, an indicator 1397, and a motor 1398.

The AP 1310 may control a plurality of hardware or software elements connected to the AP 1310 by driving an operating system or an application program, process various types of data including multimedia data, and perform calculations. The AP 1310 may be implemented by, for example, a System on Chip (SoC). According to one embodiment, the AP 1310 may further include a Graphic Processing Unit (GPU; not shown).

The communication module 1320 (e.g., the communication interface 160) may perform data transmission/reception in communication between the electronic device 1300 (e.g., the electronic device 100) and other electronic devices (e.g., the electronic device 104 and the server 164) connected thereto through a network. According to an embodiment, the communication module 1320 may include a cellular module 1321, a Wi-Fi module 1323, a BT module 1325, a GPS module 1327, an NFC module 1328, and a Radio Frequency (RF) module 1329.

The cellular module 1321 may provide a voice call, a video call, a Short Message Service (SMS), or an Internet service through a communication network (e.g., LTE, LTE-A, CDMA, WCDMA, UMTS, WiBro, OR GSM). Furthermore, the cellular module 1321 may distinguish and authenticate electronic devices within a communication network using, for example, a subscriber identification module (for example, the SIM card 1324). According to one embodiment, the cellular module 1321 may perform at least some functions which the AP 1310 may provide. For example, the cellular module 1321 may perform at least some of the multimedia control functions.

According to one embodiment, the cellular module 1321 may include a Communication Processor (CP). Furthermore, the cellular module 1321 may be implemented by, for example, an SoC. Although the elements, such as the memory 1330 or the power management module 1395, are illustrated as elements separated from the AP 1310, the AP 1310 may be configured to include at least a few (for example, the cellular module 1321) of the described elements according to an embodiment.

According to an embodiment, the AP 1310 or the cellular module 1321 (e.g., communication processor) may load, in a volatile memory, a command or data received from at least one of a non-volatile memory and other elements connected thereto, and may process the loaded command or data. Furthermore, the AP 1310 or the cellular module 1321 may store data received from or generated by at least one of other elements in a non-volatile memory.

Each of the Wi-Fi module 1323, the BT module 1325, the GPS module 1327, and the NFC module 1328 may include, for example, a processor for processing data transmitted or received through a corresponding module. Although the cellular module 1321, the WiFi module 1323, the BT module 1325, the GPS module 1327, and the NFC module 1328 are illustrated as separate blocks, at least some (for example, two or more) of the cellular module 1321, the WiFi module 1323, the BT module 1325, the GPS module 1327, and the NFC module 1228 may be included in one Integrated Chip (IC) or one IC package according to one embodiment. For example, at least some (e.g., the communication processor corresponding to the cellular module 1321 and the Wi-Fi processor corresponding to the Wi-Fi module 1323) of the processors corresponding to the cellular module 1321, the Wi-Fi module 1323, the BT module 1325, the GPS module 1327, and the NFC module 1328 may be implemented by one SoC.

The RF module 1329 may transmit/receive data, for example, an RF signal. Although not illustrated, the RF module 1329 may include, for example, a transceiver, a Power Amp Module (PAM), a frequency filter, a Low Noise Amplifier (LNA) or the like. Further, the RF module 1329 may further include an element for transmitting/receiving electronic waves over a free air space in wireless communication, for example, a conductor, a conducting wire or the like. Although the cellular module 1321, the Wi-Fi module 1323, the BT module 1325, the GPS module 1327, and the NFC module 1328 share one RF module 1229 in FIG. 13, at least one of the cellular module 1321, the Wi-Fi module 1323, the BT module 1325, the GPS module 1327, and the NFC module 1328 may transmit/receive an RF signal through a separate RF module according to one embodiment.

The SIM card 1324 may be a card including a subscriber identification module. The SIM card 1324 may include unique identification information (for example, an Integrated Circuit Card IDentifier (ICCID)) or subscriber information (for example, International Mobile Subscriber Identity (IMSI)).

The memory 1330 (e.g., the memory 130) may include an internal memory 1332 or an external memory 1334. The internal memory 1332 may include, for example, at least one of a volatile memory (e.g., a Dynamic RAM (DRAM), a Static RAM (SRAM), and a Synchronous Dynamic RAM (SDRAM)), and a non-volatile Memory (e.g., a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, and an NOR flash memory).

According to one embodiment, the internal memory 1332 may be a Solid State Drive (SSD). The external memory 1334 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 1334 may be functionally connected to the electronic device 1300 through various interfaces. According to one embodiment, the electronic device 1300 may further include a storage device (or a storage medium) such as a hard disc drive.

The sensor module 1340 may measure a physical quantity or detect an operation state of the electronic device 1300 and convert the measured or detected information to an electronic signal. The sensor module 1340 may include at least one of, for example, a gesture sensor 1340A, a gyro sensor 1340B, an atmospheric pressure sensor 1340C, a magnetic sensor 1340D, an acceleration sensor 1340E, a grip sensor 1340F, a proximity sensor 1340G, a color sensor 134011 (for example, red, green, and blue (RGB) sensor), a bio-sensor 13401, a temperature/humidity sensor 1340J, an illumination sensor 1340K, and a Ultra Violet (UV) sensor 1340M. Additionally or alternatively, the sensor module 1340 may include, for example, an E-nose sensor (not illustrated), an electromyography (EMG) sensor (not illustrated), an electroencephalogram (EEG) sensor (not illustrated), an electrocardiogram (ECG) sensor (not illustrated), an Infrared (IR) sensor, an iris sensor (not illustrated), a fingerprint sensor, and the like. The sensor module 1340 may further include a control circuit for controlling at least one sensor involved therein.

The input device 1350 may include a touch panel 1352, a (digital) pen sensor 1354, a key 1356, or an ultrasonic input device 1358. The touch panel 1352 may recognize a touch input in at least one of for example, a capacitive scheme, a resistive scheme, an infrared scheme, and an acoustic wave scheme. Further, the touch panel 1352 may further include a control circuit. In the case of the capacitive type, physical contact or proximity recognition is possible. The touch panel 1352 may further include a tactile layer. In this event, the touch panel 1352 may provide a tactile response to the user.

The (digital) pen sensor 1354 may be implemented, for example, using the same or similar method to receiving a user's touch input or using a separate recognition sheet. The key 1356 may include, for example, a physical button, an optical key, or a keypad. The ultrasonic input device 1358 may identify data by detecting an acoustic wave with a microphone (e.g., microphone 1388) of the electronic device 1300 through an input unit generating an ultrasonic signal, and may perform wireless recognition. According to an embodiment, the electronic device 1300 may receive a user input from an external device (for example, computer or server) connected thereto using the communication module 1320.

The display 1360 (e.g. the display 150) may include a panel 1362, a hologram device 1364, or a projector 1366.

The panel 1362 may be, for example, a Liquid Crystal Display (LCD) and an Active Matrix Organic Light Emitting Diode (AM-OLED) display, and the like. The panel 1362 may be implemented so as to be, for example, flexible, transparent, or wearable. The panel 1362 may be integrated with the touch panel 1352 to configure one module. The hologram device 1364 may show a stereoscopic image in the air using interference of light. The projector 1366 may project light onto a screen to display an image. The screen may be located, for example, inside or outside the electronic device 1300. According to one embodiment, the display 1360 may further include a control circuit for controlling the panel 1362, the hologram device 1364, or the projector 1366.

The interface 1370 may include, for example, a High-Definition Multimedia Interface (HDMI) 1372, a Universal Serial Bus (USB) 1374, an optical interface 1376, or a D-subminiature (D-sub) 1378. The interface 1370 may be included in, for example, the communication interface 160 illustrated in FIG. 1. Additionally or alternatively, the interface 1370 may include, for example, a Mobile High-definition Link (MHL) interface, a Secure Digital (SD)/Multi-Media Card (MMC) interface, or an Infrared Data Association (IrDA) standard interface.

The audio module 1380 may bilaterally convert a sound and an electronic signal. At least some elements of the audio module 1380 may be included in, for example, the input/output interface 140 illustrated in FIG. 1. The audio module 1380 may process sound information input or output through, for example, the speaker 1382, the receiver 1384, the earphones 1386, or the microphone 1388.

The camera module 1391 is a device for capturing a still image or a video, and according to an embodiment, may include one or more image sensors (e.g., a front sensor or a rear sensor), a lens (not illustrated), an Image Signal Processor (ISP) (not illustrated), or a flash (not illustrated) (e.g., an LED or xenon lamp).

The power management module 1395 may manage power of the electronic device 1300. Although not illustrated, the power management module 1395 may include, for example, a Power Management Integrated Circuit (PMIC), a charger Integrated Circuit (IC), or a battery or fuel gauge.

The PMIC may be mounted, for example, in integrated circuits or SoC semiconductors. The charging methods may be divided into a wired type and a wireless type. The charger IC may charge a battery and prevent inflow of excessive voltage or excessive current from a charger. According to an embodiment, the charger IC may include a charger IC for at least one of the wired charging type or the wireless charging type. The wireless charging method may include, for example, a magnetic resonance scheme, a magnetic induction scheme, or an electromagnetic scheme, and may further include an additional circuit for wireless charging, such as a coil loop, a resonance circuit, or a rectifier circuit.

The battery gauge may measure, for example, a residual quantity of the battery 1396, or a voltage, a current, or a temperature during the charging. The battery 1396 may store or generate electricity, and may supply power to the electronic device 1300 by using the stored or generated electricity. The battery 1396 may include, for example, a rechargeable battery or a solar battery.

The indicator 1397 may display a specific status of the electronic device 201 or a part (e.g. the AP 1310) of electronic device, for example, a booting status, a message status, a charging status, and the like. The motor 1398 can convert an electrical signal into a mechanical vibration. Although not illustrated, the electronic device 1300 may include a processing unit (e.g., GPU) for supporting a mobile TV. The processing device for supporting a mobile TV may process media data according to standards such as, for example, a digital multimedia broadcasting (DMB), a digital video broadcasting (DVB) or a media flow.

Each of the elements of the electronic device according to the present disclosure may be implemented by one or more elements and the name of the corresponding element may vary depending on a type of the electronic device. The electronic device according to the present disclosure may be configured by including at least one of the above-described elements, and some of the elements may be omitted, or other elements may be added. Further, some of the elements of the electronic device according to the present disclosure may be combined to be one entity, which can perform the same functions as those of the elements before the combination.

The term "module" used in the present disclosure may refer to, for example, a unit including one or more combinations of hardware, software, and firmware. The "module" may be interchangeably used with a term, such as unit, logic, logical block, element, or circuit. The "module" may be the smallest unit of an integrated element or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

Various embodiments of the present disclosure as described above can be modified or applied in various ways by a person skilled in the art to which the present disclosure belongs, and the range of the technical spirit according to various embodiments of the present disclosure should be determined by the claims below.

What is claimed is:

1. A method for operating a first electronic device, the method comprising:
    transmitting frame information to a second electronic device;
    determining whether a variance of the frame information is lower than a preset level;
    if the variance of the frame information is lower than the preset level, pausing transmission of the frame information to the second electronic device; and
    if the variance of the frame information is higher than the preset level or equal to the preset level, transmitting the frame information consecutively to the second electronic device,
    wherein upon receiving, from the second electronic device, a request for pausing the transmission of the frame information while the first electronic device and the second electronic device share a screen, pausing the transmission of the frame information to the second electronic device is performed.

2. The method of claim 1, further comprising receiving a signal including information relating to a function from the second electronic device.

3. The method of claim 2, further comprising transmitting control information comprises transmitting other frame information for displaying the information relating to the function to the second electronic device.

4. The method of claim 3, wherein the control information comprises information relating to a panel self-refresh operation.

5. The method of claim 4, wherein the panel self-refresh operation comprises an operation for displaying, in the second electronic device, a most recently stored frame among a plurality of frames stored in the second electronic device.

6. The method of claim 2, wherein the information relating to the function comprises information relating to a screen sharing function, a phone call service, a message communication service, and an application.

7. A first electronic device comprising:
a transceiver configured to transmit frame information to a second electronic device;
a processor configured to determine whether a variance of the frame information is lower than a preset level;
if the variance of the frame information is lower than the preset level, the processor is configured to pause transmission of the frame information to the second electronic device; and
if the variance of the frame information is higher than the preset level or equal to the preset level, the processor is configured to transmit the frame information consecutively to the second electronic device;
wherein upon receiving, from the second electronic device, a request for pausing the transmission of the frame information while the first electronic device and the second electronic device share a screen, pausing the transmission of the frame information to the second electronic device is performed by the processor.

8. The device of claim 7, wherein the processor configured to receive a signal corresponding to information relating to a function from the second electronic device.

9. The device of claim 8, wherein the processor configured to transmit other frame information for displaying the information relating to the function to the second electronic device.

10. A method for operating a second electronic device, the method comprising:
receiving frame information from a first electronic device;
determining whether a variance of the frame information is lower than a preset level; and
if the variance of the frame information is lower than the preset level, transmitting, to the first electronic device, a request for pausing a transmission of the frame information while the first electronic device and the second electronic device share a screen; and
if the variance of the frame information is higher than the preset level or equal to the preset level, displaying the frame information.

11. The method of claim 10, further comprising:
receiving at least one input corresponding to information relating to a function; and
transmitting a signal corresponding to the at least one input from the second electronic device to the first electronic device.

12. The method of claim 11, wherein the information relating to the function comprises information relating to a screen sharing function, a phone call service, a message communication service, and an application.

13. The method of claim 10, further comprising receiving, from the first electronic device, control information relating to a panel self-refresh operation.

14. The method of claim 13, wherein the panel self-refresh operation comprises an operation for displaying, in the second electronic device, a most recently stored frame among a plurality of frames stored in the second electronic device.

15. A second electronic device comprising:
a transceiver configured to receive frame information from a first electronic device; and
a processor configured to determine whether a variance of the frame information is lower than a preset level;
if the variance of the frame information is lower than the preset level, the processor is configured to transmit, to the first electronic device, a request for pausing a transmission of the frame information while the first electronic device and the second electronic device share a screen; and
if the variance of the frame information is higher than the preset level or equal to the preset level, the processor is configured to display the frame information.

16. The device of claim 15, wherein the processor configured to:
receive at least one input corresponding to information relating to a function;
transmit a signal corresponding to a user input to the first electronic device; and
transmit a signal corresponding to the at least one input to the first electronic device.

17. The device of claim 16, wherein the information relating to the function comprises information relating to a screen sharing function, a phone call service, a message communication service, and an application.

* * * * *